Nov. 14, 1961  W. S. LINDHARDT  3,008,756
BUG AND INSECT DIVERTER FOR VEHICLE WINDSHIELD
Filed Aug. 4, 1959
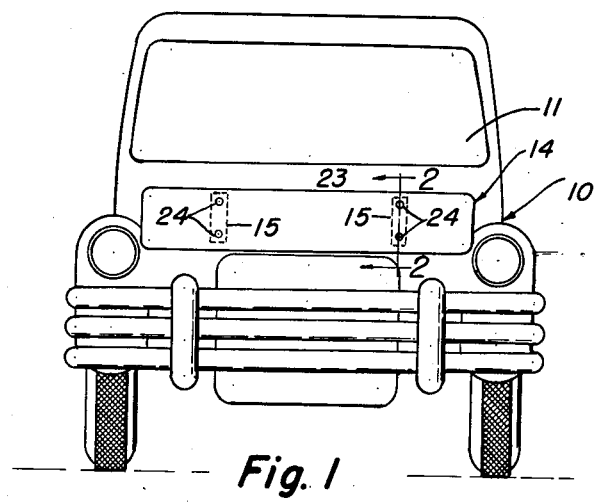
Fig. 1
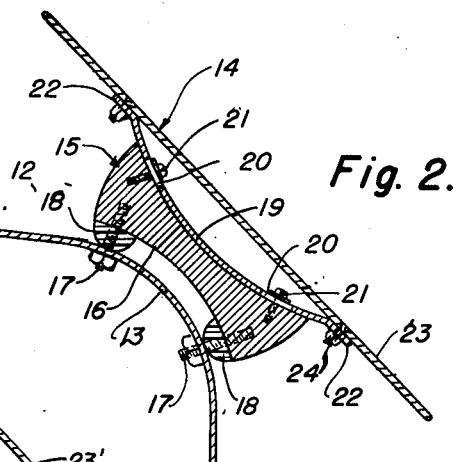
Fig. 2.
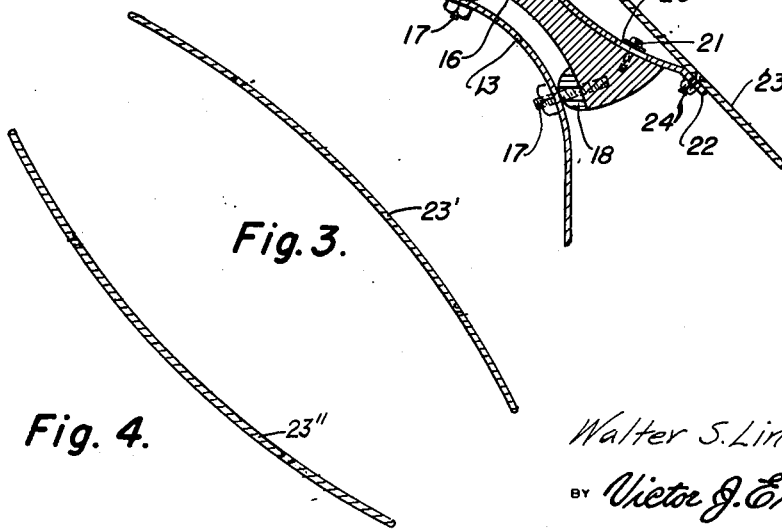
Fig. 3.
Fig. 4.
INVENTOR.
Walter S. Lindhardt.
BY *Victor J. Evans & Co.*
ATTORNEYS

3,008,756
BUG AND INSECT DIVERTER FOR VEHICLE WINDSHIELD

Walter S. Lindhardt, Ventura, Calif.
(947 Cheltenham Road, Santa Barbara, Calif.)
Filed Aug. 4, 1959, Ser. No. 831,552
2 Claims. (Cl. 296—91)

This invention relates to a diverter for use in diverting or preventing bugs, insects or the like from becoming smashed against the windshield of a vehicle.

The object of the invention is to provide a diverter which is arranged and constructed so that it will produce an upward air current which will raise flying insects or bugs above the windshield of a vehicle, so that the hazardous and irritating problem of flying bugs being smashed against the windshield will be eliminated.

Another object of the invention is to provide a vehicle windshield bug and insect diverter which can be mounted on different types of vehicles so that bugs, insects and the like can be kept off of windshields due to the action of the air current which will effectively carry the insects and bugs away from the windshield.

A further object of the invention is to provide a bug and insect diverter for a vehicle windshield, which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a front elevational view of the diverter of the present invention shown mounted on the front of a vehicle.

FIGURE 2 is a sectional view taken on line 2—2 of FIGURE 1.

FIGURES 3 and 4 are end elevational views illustrating modified diverters.

Referring in detail to the drawings, the numeral 10 indicates a conventional vehicle such as an automobile which includes the usual front windshield 11 as well as a hood 12, the numeral 13 indicates the upper front portion of the hood 12. According to the present invention there is provided a diverter which is indicated generally by the numeral 14, and the diverter 14 is adapted to be used for preventing bugs, insects or the like from becoming smashed against the front windshield 11 of the vehicle 10.

The diverter 14 includes a mounting 15, FIGURE 2, and the mountings 15 include a block 16 which is fastened to the upper front portion 13 of the hood 12 by means of a securing element 17, and resilient pads 18 may be interposed between the blocks 16 and hood so as to prevent rattling.

Arranged contiguous to the outer or upper surface of the blocks 16 is a bracket 19, FIGURE 2, and the bracket 19 is provided with slots 20 through which extend securing elements, such as the bolts 21, and the bolts 21 threadedly engage the blocks 16 so as to fasten the bracket 19 to the blocks. The bracket 19 is provided with flat outer end portions 22, and the numeral 23 indicates an inclined elongated rectangular plate member which is fastened to the flat end portion 22 by means of securing elements 24. As shown in FIGURE 2 the plate 23 is of flat formation. In FIGURE 3 there is illustrated a modification wherein the plate 23' which is adapted to be used instead of the plate 23 has a convex formation, while in FIGURE 4 there is illustrated a modification wherein the plate 23" has a concave formation.

As shown in FIGURE 1, the diverter plate 23 extends the full width of the hood.

From the foregoing, it is apparent that there has been provided a diverter which is especially suitable for use in diverting bugs and insects or the like away from a vehicle windshield such as the front windshield 11. The diverter 14 of the present invention includes the plate 23 which is arranged in inclined position as shown in FIGURE 2, and the plate 23 is mounted on the upper front portion of the hood 12. Thus, as the vehicle is driven along the plate 23 will produce air currents so that bugs, insects or the like will be carried away from the vicinity of the windshield 11 so that such bugs and insects will not be squashed or smashed on the windshield 11. The plate 23 is fastened in the bracket 19 by means of securing elements 24, and by releasing the securing elements 21, the position of the bracket may be adjusted with respect to the block 16 and then the securing elements 21 can be tightened so as to maintain the parts immobile in their adjusted position. The block 16 is fastened to the hood 12 by means of the securing elements 17, and the resilient pads 18 provide a firm mounting for the assembly. As previously stated the plates 23' or 23" may be used in lieu of or instead of the flat plate 23, and the plates 23' and 23" may be fastened in the same manner as described in connection with the plate 23.

The parts may be made of any suitable material and in different shapes or sizes.

The diverter diverts the bugs and insects by an upper air current which is established by the action of the forward movement of the vehicle which diverts the air upward and over the top of the car.

The diverter may also be used with vehicles which have hood ornaments and where the diverter would normally be mounted, a special stand off mounting can be provided for different types or models of vehicles.

Furthermore, the bug and insect diverter may be applicable as an integral part of the vehicle at the time of manufacture. For example the device may be incorporated in the hood of a car with provision made for adjustment as for example when the hood is to be opened in order to gain access to the adjusting mechanism.

As shown in the drawings, the bug diverter for the windshield mounts on the front curved portion 13 of the hood 12, between the front fenders. It will serve to keep the bugs or insects off of the windshield so that for example it will not be necessary to have insects or squashed bugs removed from the windshield at a filling station or the like. The device can be made attractive and is easy to attach or remove and will not make a noise and will not detract from the vehicle's appearance. The rubber cushions 18 may be optionally used.

By using either a flat plate 23 or curved plates 23' or 23", different amounts of diversion can be accomplished. For example when driving in the city, a straight or flat diverter plate 23 may be used, whereas when faster driving is underway, curved plates may be substituted. If desired the diverter plates may be made of plastic suitably colored, or else they may be made of metal. The entire assembly may be sold or purchased as a do-it-yourself kit and under certain conditions plywood may be used, for the plates. The entire assembly is extremely inexpensive to fabricate or sell and the full width of the hood is used for the diverter plate in order to provide the motorist or highway driver with a means of eliminating the hazardous and irritating problem of flying bugs and insects being smashed against the windshield.

With further reference to FIGURE 3, the slope of the diverter is adjustable, as for example due to the provision of the slots 20, so that the diverter of FIGURE 3 can be adjusted to the proper angle in order to cause bugs, insects or the like to be raised above the windshield of the vehicle.

Minor changes in detail coming within the scope of the present invention claimed, may be made if desired.

What is claimed is:

1. In a vehicle of the type including a hood and a windshield, a windshield diverter for diverting bugs and insects above the vehicle windshield, said diverter comprising an elongated inclined plate, mounting means for said plate, said mounting means comprising blocks fastened to the upper front portion of the hood, resilient pads interposed between said blocks and hood, a bracket adjustably connected to the upper portion of each block and said bracket having flat end portions, and securing elements connecting said plate to the flat end portions of the bracket, said diverter extending substantially the full width of the hood.

2. In a vehicle of the type including a hood and a windshield, a windshield diverter for diverting bugs and insects above the vehicle windshield, said diverter comprising an elongated inclined plate, mounting means for said plate, said mounting means comprising blocks fastened to the upper front portion of the hood, resilient pads interposed between said blocks and hood, brackets adjustably connected to the upper portion of said blocks and said brackets having flat end portions, and securing elements connecting said plate to the flat end portions of the brackets, said diverter extending substantially the full width of the hood, said brackets being provided with slots through which extend securing elements that threadedly engage the blocks so as to fasten the brackets to the blocks.

References Cited in the file of this patent

UNITED STATES PATENTS

| | | |
|---|---|---|
| 2,184,798 | Gracey | Dec. 26, 1939 |
| 2,515,604 | Kish | July 18, 1950 |
| 2,778,439 | Pfingsten | Jan. 22, 1957 |
| 2,790,676 | McMurray | Apr. 30, 1957 |
| 2,933,344 | Shumaker | Apr. 19, 1960 |

FOREIGN PATENTS

| | | |
|---|---|---|
| 734,743 | Great Britain | Aug. 3, 1955 |